United States Patent
Wilzbach et al.

(10) Patent No.: US 11,391,937 B2
(45) Date of Patent: Jul. 19, 2022

(54) METHOD AND DEVICE FOR DETERMINING A PROPERTY OF AN OBJECT

(71) Applicant: Carl Zeiss Meditec AG, Jena (DE)

(72) Inventors: Marco Wilzbach, Aalen (DE); Christoph Hauger, Aalen (DE); Stefan Saur, Aalen (DE)

(73) Assignee: Carl Zeiss Meditec AG, Jena (DE)

( * ) Notice: Subject to any disclaimer, the term of this patent is extended or adjusted under 35 U.S.C. 154(b) by 297 days.

(21) Appl. No.: 16/571,348

(22) Filed: Sep. 16, 2019

(65) Prior Publication Data

US 2020/0088983 A1 Mar. 19, 2020

(30) Foreign Application Priority Data

Sep. 18, 2018 (DE) .................. 10 2018 122 816.3

(51) Int. Cl.
*G02B 21/22* (2006.01)
*G02B 21/06* (2006.01)
(Continued)

(52) U.S. Cl.
CPC .............. *G02B 21/02* (2013.01); *G02B 21/06* (2013.01); *G02B 21/16* (2013.01); *G02B 21/22* (2013.01); *G06V 20/20* (2022.01)

(58) Field of Classification Search
CPC ........ G02B 21/02; G02B 21/16; G02B 21/06; G02B 21/361; G06K 9/00671;
(Continued)

(56) References Cited

U.S. PATENT DOCUMENTS 8,040,599 B2 10/2011 Steffen et al.
8,705,042 B2 4/2014 Haisch et al.
(Continued)

FOREIGN PATENT DOCUMENTS

DE 102017215158 A1 * 2/2019 ........... G01N 21/314
DE 102017215158 A1 2/2019
(Continued)

OTHER PUBLICATIONS

R. Hartley et al. "Multiple View Geometry in Computer Vision," pp. 2 to 48, Cambridge University Press, Mar. 2004.
(Continued)

*Primary Examiner* — Mustak Choudhury
(74) *Attorney, Agent, or Firm* — Falk Ewers; Ewers IP Law PLLC

(57) ABSTRACT

A method for determining a property of an object is disclosed, which includes: recording a first image of the object from a first direction; recording a second image of the object from a second direction; determining a first position in the first image, the first position representing a location of the object, and a second position in the second image, the second position representing the same location of the object, for a multiplicity of locations of the object; and calculating a value of an object property for each of the multiplicity of locations of the object. The value assigned to a location of the multiplicity of locations of the object is calculated using an intensity value at the first position, which represents the location, in the first image and an intensity value at the second position, which represents the location, in the second image.

22 Claims, 7 Drawing Sheets

(51) Int. Cl.
*G02B 21/02* (2006.01)
*G02B 21/16* (2006.01)
*G06V 20/20* (2022.01)

(58) Field of Classification Search
CPC ......... G06K 9/4661; G06K 2009/2045; G06K 2009/6213; G01J 3/0208; G01J 3/0291; G01J 3/2823; G01J 3/36; G01N 2021/6423; G01N 2021/6421; G01N 21/255; G01N 21/6458
See application file for complete search history.

(56) References Cited

U.S. PATENT DOCUMENTS

| 10,872,414 | B2 | 12/2020 | Aoki et al. | |
|---|---|---|---|---|
| 2017/0237958 | A1 | 8/2017 | Themelis | |
| 2018/0024341 | A1 | 1/2018 | Romanowski et al. | |
| 2018/0168769 | A1* | 6/2018 | Wood | A61B 1/045 |
| 2018/0270474 | A1 | 9/2018 | Liu | |
| 2021/0021795 | A1 | 1/2021 | Themelis | |
| 2021/0243425 | A1 | 8/2021 | Liu | |

FOREIGN PATENT DOCUMENTS

| DE | 102017221187 | A1 | 5/2019 |
|---|---|---|---|
| JP | 2004163413 | A | 6/2004 |
| JP | 2009525495 | A | 7/2009 |
| JP | 2017148503 | A | 8/2017 |
| JP | 2018514748 | A | 6/2018 |
| WO | 2016127173 | A1 | 8/2016 |
| WO | 2017217180 | A1 | 12/2017 |

OTHER PUBLICATIONS

P.A. Valdes et al. "A spectrally constrained dual-band normalization technique for protoporphyrin IX quantification in fluorescence-guided surgery,", Opt. Lett. 37(11), OSA, pp. 1817 to 1819, 2012.

Office Action by the German Patent and Trademark Office issued in DE application No. 10 2018 122 816.3, to which this application claims priority, dated Jul. 15, 2019, and English-language translation thereof.

Office Action dated Nov. 10, 2020 issued in Japanese counterpart application No. 2019-169044 and English-language Office Action Summary thereof.

Office Action dated Jul. 6, 2021 issued in Japanese counterpart application No. 2019-169044 and English-language Office Action Summary thereof.

Office Action dated Nov. 9, 2021 issued in Japanese counterpart application No. 2019-169044 and English-language Office Action Summary thereof.

* cited by examiner

METHOD AND DEVICE FOR DETERMINING A PROPERTY OF AN OBJECT

CROSS REFERENCE TO RELATED APPLICATIONS

This application claims priority to German patent application DE 10 2018 122 816.3 filed on Sep. 18, 2018, which is hereby incorporated by reference in its entirety.

TECHNICAL FIELD

The present disclosure relates to methods and devices for determining a property of an object, in particular for determining the spatially resolved distribution of the concentration of a substance in the object.

BACKGROUND

In accordance with one conventional method for determining a spatially resolved distribution of a concentration of a substance in an object, firstly two images of the object are recorded with light in different wavelength ranges. By way of example, a beam path is provided which images the object onto a light image detector suitable for detecting visible and infrared light in a spatially resolved manner. In order to record an image with light in a first wavelength range, a first optical filter is introduced into the beam path, the filter suppressing light having wavelengths that lie outside the first wavelength range. In this case, only light in the first wavelength range is passed to the light image detector, which can then record a first image with light in the first wavelength range. In order to detect a second image, a different optical filter is introduced into the beam path, the filter suppressing light having wavelengths outside a second wavelength range, such that only light in the second wavelength range is imaged onto the light image detector. The latter can then record the second image with light in the second wavelength range. The first and second images are thus recorded temporally successively by the same light image detector and can then be used to calculate a spatially resolved distribution of a concentration of a substance in the object. This method has the disadvantage that the optical filters have to be introduced into and removed from the beam path and the images are recorded successively, with the result that carrying out the method takes a comparatively long time.

Instead of introducing a plurality of different optical filters successively into the beam path, a multispectral image sensor can be used, onto which the object is imaged. The multispectral image sensor has a multiplicity of photosensitive pixels with different optical microfilters arranged upstream thereof, such that the multispectral image sensor can simultaneously detect images in different wavelength ranges. The use of such multispectral image sensors has the disadvantage, however, that the optical microfilters generally are usable only for a single application, since the transmission of the microfilters cannot be altered.

Finally, a camera system can be used instead of the multispectral image sensor, which camera system spatially separates the beam path, individually filters the separated beam paths and feeds the filtered beam paths to different light image detectors. Such a camera system can therefore likewise simultaneously detect images in different spectral ranges. The disadvantage of such a camera system, however, is the high complexity of the system and the costs resulting from the high number of light image detectors.

SUMMARY

Therefore, the problem addressed by the present disclosure is that of providing devices and methods with which a spatially resolved distribution of a property of an object, in particular a spatially resolved distribution of the concentration of a substance present in the object, can be determined and the disadvantages mentioned above are nevertheless overcome.

One aspect of the present disclosure relates to a method for determining a property of an object. The method comprises recording a first image of the object from a first direction by the object being imaged onto a detection surface of a first light image detector with light in a first wavelength range, the light emanating from the object by means of a microscope optical unit; and recording a second image of the object from a second direction by the object being imaged onto a detection surface of a second light image detector with light in a second wavelength range, the light emanating from the object, with the microscope optical unit.

The method further comprises determining a first position in the first image, the first position representing a location of the object, and a second position in the second image, the second position representing the same location of the object, for a multiplicity of locations of the object.

The method further comprises calculating a value of an object property for each of the multiplicity of locations of the object, wherein the value assigned to a location of the multiplicity of locations of the object is calculated using an intensity value at the first position, which represents the location, in the first image and an intensity value at the second position, which represents the location, in the second image.

The first image and the second image are recorded from two different directions. By way of example, the first and second images are recorded in the two different stereo branches of a stereomicroscope and are therefore stereoscopic half-images of a stereo image. A stereomicroscope is a microscope which can image an object plane onto two separate image planes (first and second image planes) from two different directions. For this purpose, the detection surface of the first light image detector can be arranged in the first image plane and the second detection surface of the second light image detector can be arranged in the second image plane. The first and second directions differ by at least 1° or at least 2°, for example.

The microscope optical unit images the object onto the detection surface of the first light image detector, wherein this is effected with the light in the first wavelength range that emanates from the object. The first light image detector is configured to detect the intensity of the light impinging on the detection surface of the first light image detector in a spatially resolved manner. In an analogous manner, the microscope optical unit images the object onto the detection surface of the second light image detector, wherein this is effected with the light in the second wavelength range emanating from the object. The second light image detector is configured to detect the intensity of the light impinging on the detection surface of the second light image detector in a spatially resolved manner.

The first and second wavelength ranges are different from one another. In particular, the two wavelength ranges (at most) partly overlap or they do not overlap.

The first and second images both represent a region of the object. However, the first and second images are recorded by different light image detectors from different directions. The first and second images therefore represent the object from different perspectives, and so it is not trivial to detect those positions in the first and second images which represent the same location of the object. A position in the first image and a position in the second image which represent the same location of the object are referred to as corresponding positions in relation to this location of the object. They are dependent on a plurality of factors, for example on the perspective imaging of the object onto the different light image detectors, on the alignment of the microscope optical unit and the light image detectors with respect to one another, and on the height profile of the object.

The method involves determining corresponding positions in the first and second images for a multiplicity of locations of the object which are contained both in the first image and in the second image. That is to say that, for each of the multiplicity of locations of the object, a first position in the first image is determined, the first position representing a determined location of the multiplicity, and a second position corresponding thereto in the second image is determined, the second position representing the same location. An assignment is thereby determined which indicates the corresponding positions in the first and second images, specifically for a multiplicity of locations of the object.

By way of example, the first and second images each contain a multiplicity of pixels and the method involves determining which pixel of the first image and which pixel of the second image respectively represent the same location of the object, wherein this assignment is determined for a multiplicity of locations of the object.

The method involves calculating, for each of the multiplicity of locations of the object, a value of a property of the object using the first and second images and using the assignment indicating the corresponding positions in the first and second images. In this case, the value of the object property that is assigned to a location of the multiplicity of locations of the object is calculated using an intensity value at the first position in the first image and an intensity value at the second position in the second image, wherein the first and second positions represent this location of the multiplicity.

A spatially resolved distribution of an object property of an object can thus be determined from two images which were recorded with light in different wavelength ranges. The images can be recorded simultaneously since two separate light image detectors are provided for this purpose. Possible filters defining the first and second wavelengths would not have to be moved during the method. The method makes possible diverse applications by virtue of the first and second wavelength ranges being correspondingly adapted. The method can be carried out using a conventional stereomicroscope with adapted control.

In accordance with one embodiment, the first position of the first image corresponds to a first location on the detection surface of the first light image detector, wherein the location of the object that is represented by the first position is imaged onto the first location of the detection surface of the first light image detector by means of the microscope optical unit; and the second position of the second image corresponds to a second location on the detection surface of the second light image detector, wherein the location of the object that is represented by the second position is imaged onto the second location of the detection surface of the second light image detector with the microscope optical unit.

The microscope optical unit images the object along the first direction onto the detection surface of the first light image detector and images the object along the second direction onto the detection surface of the second light image detector. For each location of the multiplicity of locations of the object there exist, therefore, as a result of the imaging with the microscope optical unit, on the detection surface of the first light image detector a first location and on the detection surface of the second light image detector a second location, onto which the location of the object is imaged. The first location on the detection surface of the first light image detector and the second location on the detection surface of the second light image detector are therefore corresponding locations because the same location of the object is imaged onto them and the first and second locations thus represent the same location of the object. The first position in the first image and the first location on the detection surface of the first light image detector therefore represent the same location of the object. Likewise, the second position in the second image and the second location on the detection surface of the second light image detector represent this same location of the object.

In accordance with an exemplary embodiment, the first image has a multiplicity of first pixels and an intensity value is assigned to each first pixel, wherein the intensity value at the first position in the first image is determined on the basis of the intensity value of that first pixel which contains the first position.

In this exemplary embodiment it is clarified that the intensity value at a position in the first image is determined on the basis of the intensity value of the pixel which contains this position. Alternatively or additionally, the intensity value at the first position can be determined on the basis of the intensity value of at least one of the first pixels which adjoin the pixel containing the first position. This variant involves taking into account (also) the intensity values of those pixels of the first image which directly surround the pixel containing the first position. Consequently, the intensity value at a first position in the first image can be calculated for example as a linear combination of the intensity values of those pixels of the first image which contain the first position or directly surround the latter, wherein weights of different magnitudes influence the linear combination depending on the situation of the first position with respect to the pixels.

The intensity value at a first position in the first image can further or alternatively be determined by a non-linear operation on the intensity values of the pixel containing the first position and pixels surrounding the pixel. By way of example, the minimum, maximum or median intensity value of these pixels is determined as the intensity value at the first position.

In accordance with an exemplary embodiment, the second image has a multiplicity of second pixels and an intensity value is assigned to each second pixel, wherein the intensity value at the second position in the second image is determined on the basis of the intensity value of that second pixel which contains the second position.

In this exemplary embodiment, it is clarified that the intensity value at a position in the second image is determined on the basis of the intensity value of the pixel which contains this position. Alternatively or additionally, the intensity value at the second position can be determined on the basis of the intensity value of at least one of the second pixels which adjoin the pixel containing the second position. This variant involves taking into account (also) the intensity values of those pixels of the second image which directly surround the pixel containing the second position. Consequently, the intensity value at a second position in the second image can be calculated for example as a linear combination of the intensity values of those pixels of the second image which contain the second position or directly surround the latter, wherein weights of different magnitudes influence the linear combination depending on the situation of the second position with respect to the pixels.

The intensity value at a second position in the second image can further or alternatively be determined by a non-linear operation on the intensity values of the pixel containing the second position and pixels surrounding the pixel. By way of example, the minimum, maximum or median intensity value of these pixels is determined as the intensity value at the second position.

In accordance with an exemplary embodiment, the first position and the second position for each location of the multiplicity of locations of the object are determined on the basis of an analysis of images of the object, wherein the shape of at least one structure of the object is analyzed in the images, wherein the images are recordings of the object from the first and second directions. The images in which the shape of at least one structure of the object is analyzed in order to determine the first position and the second position for each location of the multiplicity of locations of the object can be, for example, the first image and the second image, but also images that are different therefrom.

In this exemplary embodiment, the corresponding positions are determined by an analysis of the structures present in the object. By way of example, high-contrast forms are situated in the object and are recognized by image analysis methods in the images and corresponding positions in the images can thus be determined. Such image processing methods can for example determine the correlation between the images and use it to determine the corresponding positions. The corresponding positions determined in the images in this way can be transferred to the first and second images in a simple manner because the images were recorded from the same perspectives, namely the first and second directions, as the first and second images.

In accordance with an exemplary embodiment, the method further comprises determining a coordinate transformation that defines a transition of coordinates of a first coordinate space of the first image into a second coordinate space of the second image, wherein the first position and the second position for each location of the multiplicity of locations of the object are determined on the basis of the coordinate transformation.

This exemplary embodiment involves determining a coordinate transformation, which can be for example a projective transformation, an affine transformation, a similarity transformation or a Euclidian transformation. The coordinate transformation indicates a specification of how a coordinate of the first coordinate space, i.e., a coordinate of the coordinate space of the first image, is transformed/mapped into a coordinate of the second coordinate space, i.e., a coordinate of the coordinate space of the second image. The coordinates of the first and second images that are transformed/mapped onto one another by the coordinate transformation indicate positions in the first and second images which represent the same location of the object. The first and second coordinate spaces are a two-dimensional coordinate space, for example.

The coordinate transformation can be parameterized by one or more parameters from a group of parameters, wherein the group of parameters comprises: displacement between the first and second coordinate spaces, rotation of the first coordinate space relative to the second coordinate space, magnification of the microscopy optical unit in the course of recording the first and/or second image, the first and/or second direction, imaging aberrations of the microscopy optical unit, and a height profile of the object.

In one exemplary embodiment of a coordinate transformation, the second coordinate space is parameterized only by the displacement between the first and second coordinate spaces. The displacement indicates for example the translational offset between the first and second images that arises as a result of the relative arrangement of the light image detectors and as a result of the stereoscopic imaging by the microscopy optical unit. Accordingly, the coordinate transformation expresses the translation between coordinates of the first and second coordinate systems which represent the same location of the object.

Other and/or further parameters can parameterize the coordinate transformation. Consequently, further effects of the relative arrangement of the light image detectors and of the stereoscopic imaging by the microscopy optical unit can be expressed by the coordinate transformation. In particular, it is possible to take account of the possibly individually settable magnifications of the optical imaging of the microscopy optical unit in the two stereo channels thereof, wherein this information can be provided by a controller, for example. Further, it is possible to express imaging aberrations of the microscopy optical unit that are known a priori in the coordinate transformation.

The stereoscopic recording of the first and second images results, in principle, in a perspective optical imaging of the object onto the light image detectors. These properties of the optical imaging of the microscopy optical unit can also be expressed in the coordinate transformation.

Depending on the number of parameters defining the coordinate transformation and the quality to be achieved of the values for these parameters, only a small number of corresponding positions in the first and second images in comparison with the total number of pixels of the first and second images have to be determined to determine the coordinate transformation. Consequently, the coordinate transformation can be determined comparatively rapidly.

Some parameters of the coordinate transformation can also be determined by reference measurements before the first and second images are recorded. Accordingly, only those values of the parameters which are dependent on the present setting of the microscopy optical unit have to be determined during the method. However, these can be provided by a controller (for example magnification of the microscopy optical unit). Consequently, all values of the parameters defining the coordinate transformation can already be determined before the first and second images are recorded.

With the completely defined coordinate transformation, it is then possible to determine the first position and the second position for each location of the multiplicity of locations of the object in a simple manner.

In accordance with an exemplary embodiment, the method further comprises determining a height profile of the object, the height profile indicating the extent of the object measured along a height direction as a function of at least one transverse direction oriented perpendicularly to the height direction, wherein the first position and the second position for each location of the multiplicity of locations of the object are determined on the basis of the height profile. The height profile can be a parameter of the coordinate transformation.

Corresponding positions in the first and second images are dependent on the height profile of the object since the first and second images are recorded from different directions. With knowledge of the imaging properties of the microscope optical unit and of the height profile of the object, it is possible to calculate corresponding positions in the first and second images. The imaging properties of the microscope optical unit can be determined for example with a reference object, the height profile of which is known. The height profile of the object can in turn be determined by various methods, for example by triangulation or stereoscopy.

In accordance with an exemplary embodiment, the method further comprises exposing the object with illumination light, such that the light emanating from the object comprises light in the first wavelength range and light in the second wavelength range; wherein the object property is the concentration of one of a plurality of substances present in the object, wherein each of the substances contributes to the generation of the light emanating from the object as a result of the exposure with the illumination light.

In this exemplary embodiment, the object contains a plurality of different substances and a spatially resolved distribution of the concentration of one of the substances is determined. A prerequisite for this method is that the substances contained in the object contribute in different ways to the generation of the light emanating from the object on account of the illumination. By way of example, the light in the first and second wavelength ranges that emanates from the object is composed (substantially only) of two contributions caused by two substances present in the object. The substances have a known emission behavior in the first and second wavelength ranges, wherein the emission behavior of the two substances differs from one another in the first and second wavelength ranges. On the basis of this known emission property, of the known spectral intensity distribution of the illumination light and of the first and second images, it is possible to determine the concentration of one or more of the substances for the multiplicity of locations of the object by using the intensity values at corresponding positions in the first and second images. In this way, for each pair of corresponding positions, a value of the concentration of one or more of the substances can be determined and a spatially resolved distribution of the concentration can thus be determined.

The emission behavior can be based on various interactions, for example scattering/extinction, fluorescence or the like.

A detailed description of a specification for calculating a spatially resolved distribution of the concentration of one of a plurality of substances present in the object is described for example in the present applicant's patent applications DE 10 2017 221 187.3 and DE 10 2017 215 158.7, the disclosure of which is fully incorporated by reference herein.

In accordance with an exemplary embodiment, the method further comprises exposing the object with light in the first wavelength range and with light in the second wavelength range; wherein the first image is recorded (substantially exclusively) with light in the first wavelength range emanating from the object; wherein the second image is recorded (substantially exclusively) with light in the second wavelength range emanating from the object; and wherein the object property is the concentration of a haemodynamic variable, such that a spatially resolved distribution of the concentration of the haemodynamic variable is calculated. "Substantially exclusively" means, for example, that the intensity of the light having a wavelength within the first wavelength range that is fed to the first light image detector is greater at least by a factor of 100 or at least by a factor of 1000 than the intensity of the light having any wavelength outside the first wavelength range that is fed to the first light image detector. Moreover, "substantially exclusively" means, for example, that the intensity of the light having a wavelength within the second wavelength range that is fed to the second light image detector is greater at least by a factor of 100 or at least by a factor of 1000 than the intensity of the light having any wavelength outside the second wavelength range that is fed to the second light image detector.

In this exemplary embodiment, the concentration of a haemodynamic variable is calculated, for example the concentration of oxygenated or deoxygenated haemoglobin. The method is based on the detection of light that is backscattered at the haemodynamic variable in the object or is absorbed by the latter. Accordingly, both the illumination light and the light that emanates from the object and is detected by the light image detectors in each case comprise light in the first and second wavelength ranges.

The first wavelength range extends for example from 410 nm to 430 nm or from 440 nm to 460 nm. The second wavelength range extends for example from 640 nm to 660 nm. In these wavelength ranges, the extinction behavior of oxygenated haemoglobin and that of deoxygenated haemoglobin differ greatly from one another, and so the concentration of oxygenated and deoxygenated haemoglobin can be determined well.

In accordance with an exemplary embodiment, the method further comprises exciting a plurality of different fluorescent emitters distributed in the object, such that the light emanating from the object comprises fluorescent light from the plurality of fluorescent emitters; wherein the first image is recorded (substantially exclusively) with light in the first wavelength range; wherein the second image is recorded (substantially exclusively) with light in the second wavelength range; wherein the first and second wavelength ranges together at least partly comprise each of the emission wavelength ranges of the plurality of fluorescent emitters; and wherein the object property is the concentration of one of the plurality of fluorescent emitters, such that a spatially resolved distribution of the concentration of the fluorescent emitter is calculated.

In accordance with this exemplary embodiment, the object contains a plurality of different fluorescent emitters. The fluorescent emitters can be fluorescent emitters added artificially to the object, such as fluorescent dyes, for example. By way of example, protoporphyrin IX, fluorescein, indocyanine green or some other fluorescent dye can be added to the object in order to label specific substances in the object. Additionally or alternatively, the fluorescent emitters can comprise natural fluorescent emitters, i.e., substances which are not added artificially to the object, and are nevertheless fluorescent.

By way of example, the aim of the method is to determine the spatially resolved distribution of protoporphyrin IX in the object, wherein the autofluorescence of the object that occurs in the emission wavelength range of protoporphyrin IX is intended to be eliminated.

The object is exposed with illumination light suitable for exciting protoporphyrin IX. The illumination light also unavoidably brings about the excitation of an autofluorescent substance, with the result that a plurality of different fluorescent emitters distributed in the object are excited.

Protoporphyrin IX and the autofluorescent substance have different wavelength-dependent emission characteristics. The first and second wavelength ranges are chosen such that at least one of the two wavelength ranges contains at least one portion of the emission wavelength range of protoporphyrin IX and at least one of the other two wavelength ranges contains at least one portion of the emission wavelength ranges of the autofluorescent substance. As a result, it becomes possible to separate the proportions of the light having the same wavelength that emanates from the object according to the contributions of the different fluorescent emitters.

Using the first and second images, the knowledge of corresponding positions therein, the emission behavior of the fluorescent emitters contained in the object, and the spectral intensity distribution of the illumination light, it is possible to calculate the concentration of one or more fluorescent emitters contained in the object.

In accordance with an exemplary embodiment, the method further comprises filtering the light emanating from the object such that (substantially exclusively) light in the first wavelength range is fed to the first light image detector, and so the first image is recorded (substantially exclusively) with light in the first wavelength range emanating from the object; and filtering the light emanating from the object such that (substantially exclusively) light in the second wavelength range is fed to the second light image detector, and so the second image is recorded (substantially exclusively) with light in the second wavelength range emanating from the object.

Depending on the application, it may be expedient to restrict the light impinging on the respective light image detectors to light in the first and second wavelength range, respectively. For this purpose, the light emanating from the object, which light is fed to the first light image detector, in the wavelength range outside the first wavelength range is suppressed, for example in its intensity by a factor of at least 100 or at least 1000. Further, for this purpose, the light emanating from the object, which light is fed to the second light image detector, in the wavelength range outside the second wavelength range is suppressed, for example in its intensity by a factor of at least 100 or at least 1000.

In accordance with an exemplary embodiment, the method further comprises generating and representing a third image, which represents the values of the object property. Additionally or alternatively, it is possible to generate and represent a stereo image comprising a first stereoscopic half-image and a second stereoscopic half-image, wherein the first half-image represents the values of the object property, in particular in superimposition with the first image, and wherein the second half-image represents the values of the object property, in particular in superimposition with the second image.

A further aspect of the disclosure relates to a device, in particular a microscopy system, configured to carry out the methods described herein.

BRIEF DESCRIPTION OF THE DRAWINGS

The disclosure will now be described with reference to the drawings wherein.

DESCRIPTION OF EXEMPLARY EMBODIMENTS

Figure 1:
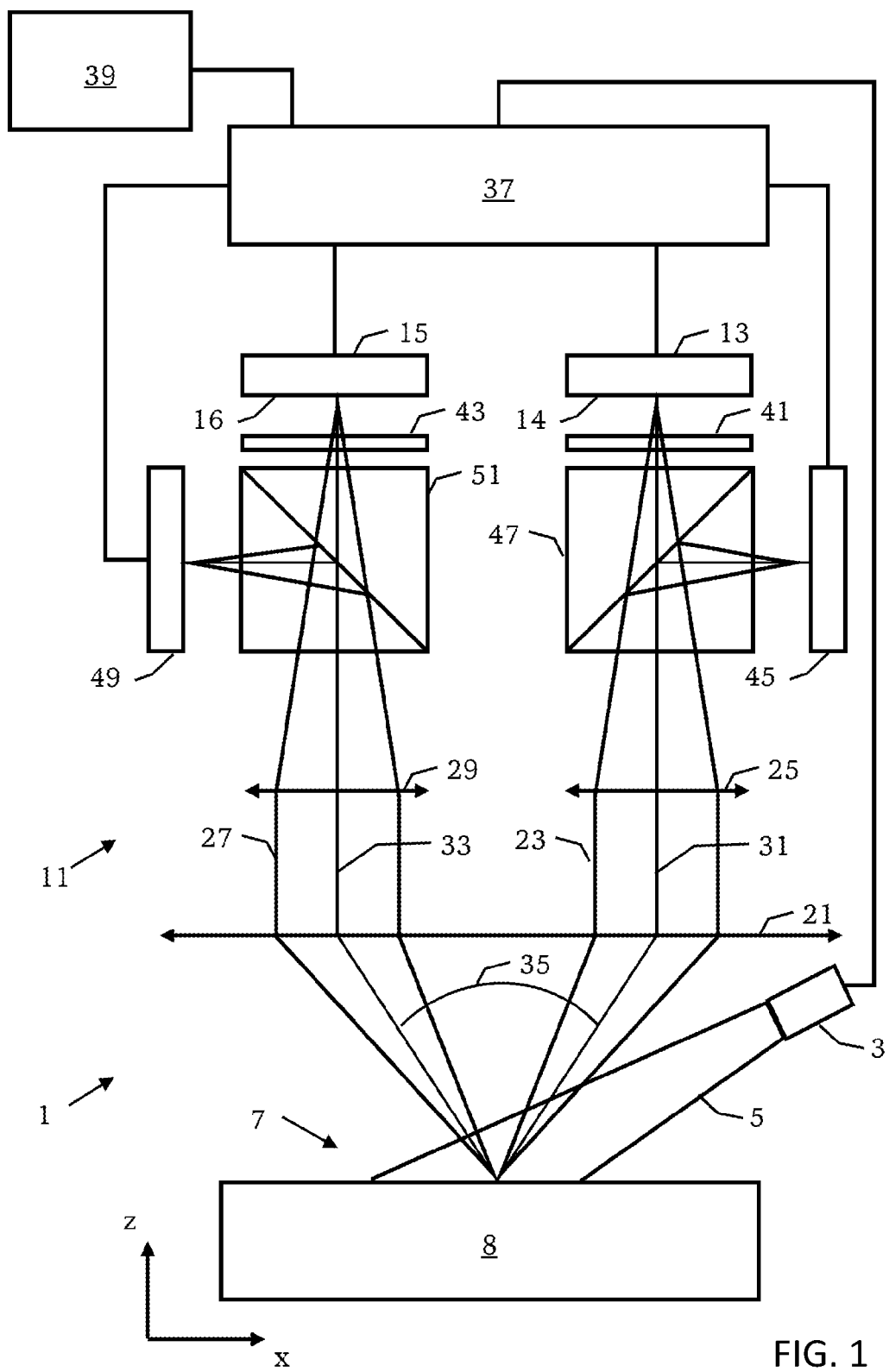
FIG. 1 shows an exemplary embodiment of a microscopy system configured to carry out the methods described herein.

FIG. 1 shows a schematic illustration of a microscopy system 1 in accordance with an exemplary embodiment. The microscopy system 1 comprises an illumination device 3 configured to generate illumination light 5 and to direct it onto an object region 7, in which an object 8 is arranged.

The microscopy system 1 comprises a microscope optical unit 11 configured to image the object 8 onto a detection surface 14 of a first light image detector 13 from a first direction. For this purpose, the microscope optical unit 11 provides a first beam path 23 generated by an objective 21 of the microscope optical unit 11 and a first lens system 25 of the microscope optical unit 11.

Further, the microscope optical unit is configured to image the object 8 onto a detection surface 16 of a second light image detector 15 from a second direction. For this purpose, the microscope optical unit 11 provides a second beam path 27 generated by the objective 21 and a second lens system 29 of the microscope optical unit 11.

A central ray 31 of the first beam path 23 and a central ray 33 of the second beam path 27 between the object 8 and the objective 21 define the first and second directions. A stereo angle 35 between the first and second directions is, in practice, at least 1° and can have values of up to approximately 40°.

The first light image detector 13 generates a first image representing a spatially resolved distribution of the intensity of the light impinging on the detection surface 14. The second light image detector 15 generates a second image representing a spatially resolved distribution of the intensity of the light impinging on the detection surface 16.

The first light image detector 13 and the second light image detector 15 are connected to a controller 37 of the microscopy system 1. The controller 37 receives from the first light image detector 13 a signal representing the first image. Further, the controller 37 receives from the second light image detector 15 a signal representing the second image. The controller 37 is configured to carry out the method according to the disclosure.

The microscopy system 1 further comprises a display system 39, which is connected to the controller 37 and is configured to represent monoscopic images or stereoscopic images generated by the controller 37.

The microscopy system 1 further comprises a first optical filter 41, which is arranged in the first beam path 23 and transmits substantially only light in a first wavelength range. The microscopy system 1 further comprises a second optical filter 43, which is arranged in the second beam path 27 and transmits substantially only light in a second wavelength range.

As a result, the first image is recorded substantially only with light in the first wavelength range; and the second image is recorded substantially only with light in the second wavelength range.

The microscopy system 1 further comprises a first color image detector 45 and a first beam splitter 47. The first beam splitter 47 is arranged in the first beam path 23 in order to direct a part of the first beam path 23 onto the first color image detector 45. Consequently, the microscope optical unit 11 images the object 8 onto the first color image detector 45, which is configured to record a color image of the object 8. The first color image detector 45 is connected to the controller 37, which receives from the first color image detector 45 a signal representing the image recorded by the first color image detector 45.

The microscopy system 1 further comprises a second color image detector 49 and a second beam splitter 51. The second beam splitter 51 is arranged in the second beam path 27 to direct a part of the second beam path 27 onto the second color image detector 49. Consequently, the microscope optical unit 11 images the object 8 onto the second color image detector 49, which is configured to record a color image of the object 8. The second color image detector 49 is connected to the controller 37, which receives from the second color image detector 49 a signal representing the image recorded by the second color image detector 49.

Figure 2:
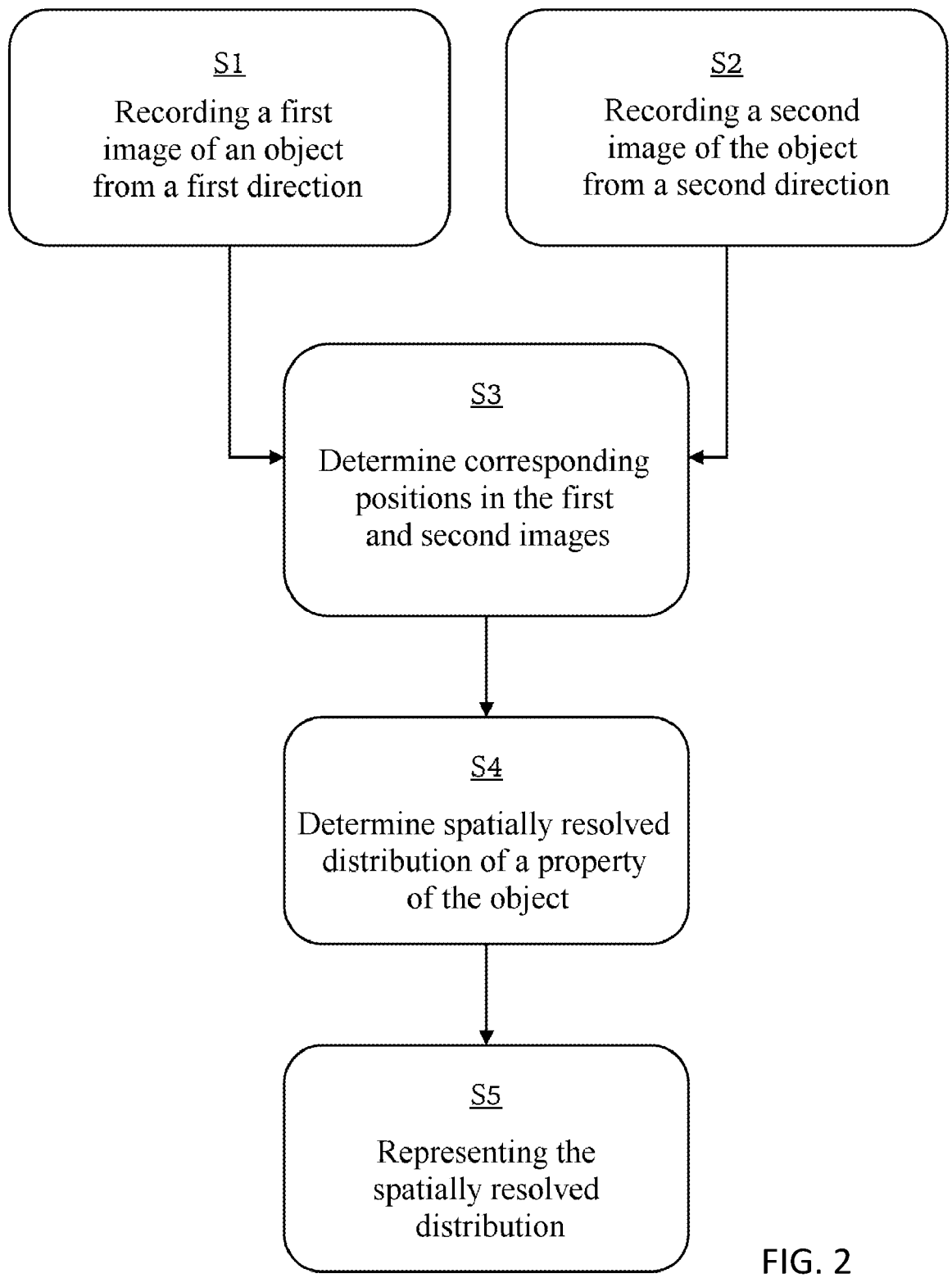
FIG. 2 shows an exemplary embodiment of a method for determining a property of an object.

FIG. 2 shows a schematic illustration of a method for determining a property of the object 8.

A step S1 involves recording a first image of the object 8 from the first direction. This is carried out, for example, by the light in the first wavelength range that emanates from the object 8 being imaged onto the detection surface 14 of the first light image detector 13 by the microscope optical unit 11.

Afterwards or simultaneously, in accordance with step S2, a second image of the object 8 is recorded from the second direction. This is done, for example, by the light in the second wavelength range that emanates from the object 8 being imaged onto the detection surface 16 of the second light image detector 15 with the microscope optical unit 11.

A step S3 involves determining a first position in the first image and a second position in the second image for each location of a multiplicity of locations of the object 8, wherein the first and second positions represent the same location of the multiplicity of locations of the object. The first position in the first image and the second position in the second image, which represent in each case the same location of the object, are referred to as corresponding positions. Step S3 is carried out by the controller 37.

Figure 3:
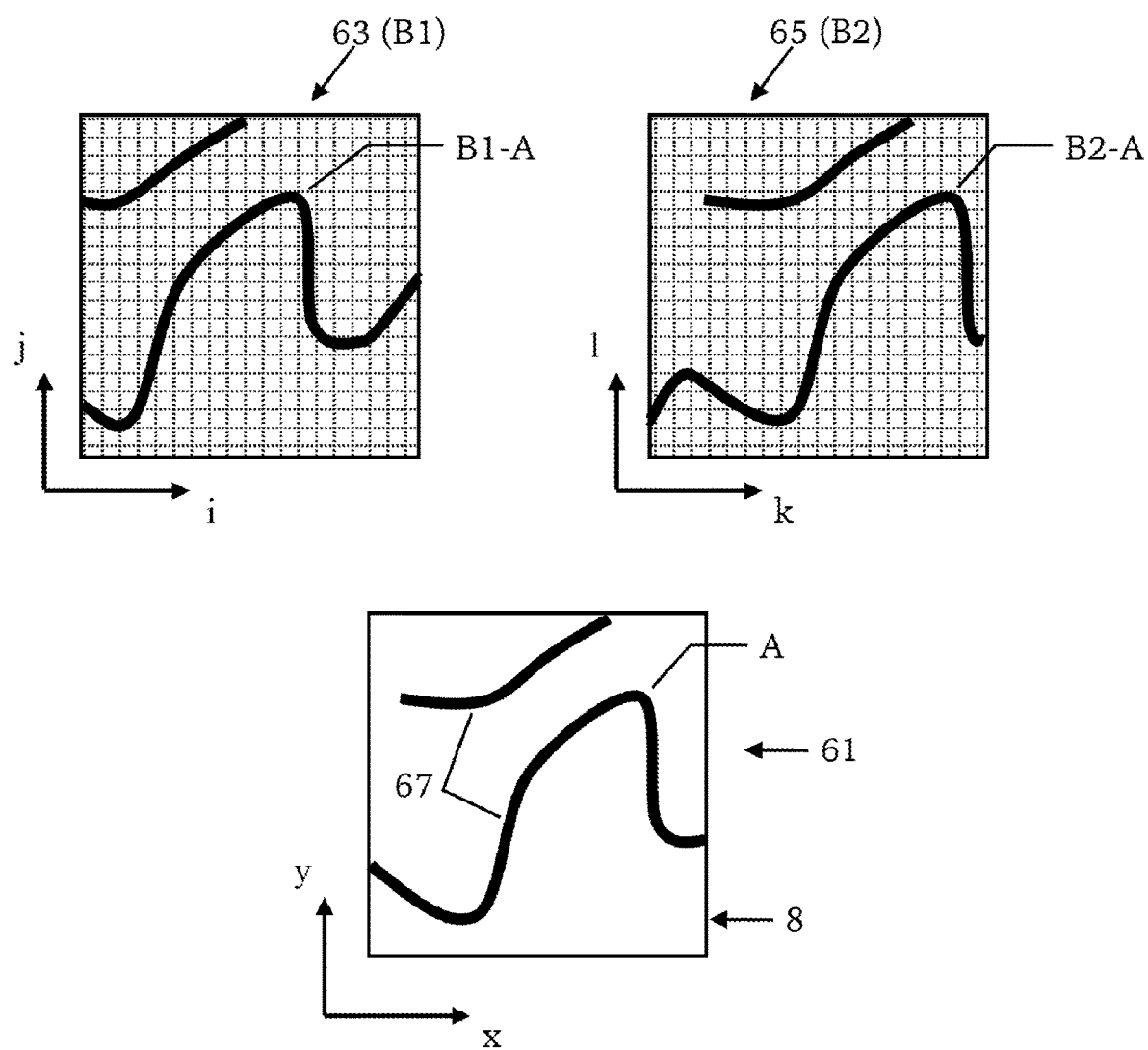
FIG. 3 shows representations of structures in an object and representations of the structures after imaging in a first and a second image.

An exemplary method for determining the corresponding positions is explained in greater detail with reference to FIG. 3, which serves to elucidate a method for determining corresponding positions in the first and second images. FIG. 3 comprises three diagrams 61, 63, and 65. Diagram 61 shows an excerpt from the object 8 in the x-y-plane, which is oriented perpendicularly to the z-axis shown in FIG. 1. For explanation purposes, the excerpt contains two structures 67 of the object 8.

Figure 4:
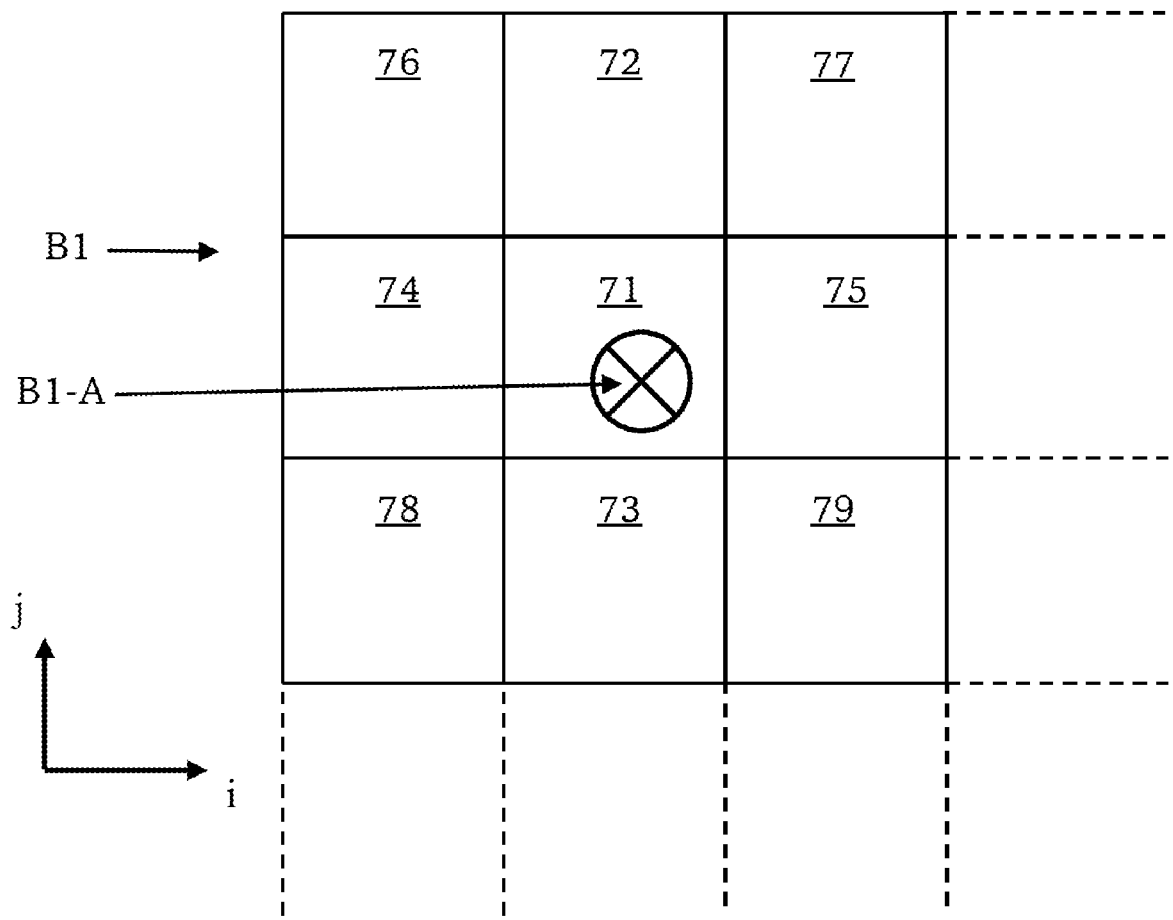
FIG. 4 shows an excerpt from a multiplicity of pixels of a first image of the object.

Diagram 63 shows the first image B1 and diagram 65 shows the second image B2. The first image B1 and the second image B2 each contain of a multiplicity of pixels, represented as squares identified by dashed lines. The pixels of the first image B1 are indexed by the discrete coordinates i and j; the pixels of the second image B2 are indexed by the discrete coordinates k and l. Since the first image B1 and the second image B2 were recorded from different directions with respect to the object 8, the first image B1 and the second image B2 show the object 8 from different perspectives. The recording of the two images from different perspectives is a first reason why the first image B1 and the second image B2 are not congruent, which is illustrated in FIG. 3 by the fact that the first and second images contain the structures 67 at different positions. A further reason why the first image B1 and the second image B2 are generally not congruent is the limited precision with which the microscope optical unit 11 and the light image detectors 13 and 15 are aligned with one another. A further reason, explained later in association with FIG. 4, is the height profile of the object 8. These various reasons have the effect that the location A of the object 8 as illustrated in diagram 61 is imaged onto a first position B1-A in the first image B1 and is imaged onto a second position B2-A in the second image B2 by the microscope optical unit 11. Accordingly, the coordinates i, j of that pixel in the image B1 which contains the position B1-A differ from the coordinates k, l of that pixel of the second image B2 which contains the position B2-A. The first position B1-A and the second position B2-A are corresponding positions representing in each case the location A of the object 8.

Step S3 illustrated in FIG. 2 involves determining corresponding positions in the first image B1 and the second image B2 for a multiplicity of locations of the object 8. This is achieved for example by methods which analyze the shape/form of at least one of the structures 67 of the object 8 and determine the corresponding positions in this way. By way of example, the shape/form of the structures 67 is analyzed in the first image B1 and in the second image B2 and corresponding positions are determined by means of correlation. The first image B1 and the second image B2 can be used for this purpose. Alternatively, however, it is also possible to use other images which are recorded from the first and second directions and whose assignment to the first and second images, respectively, is known or determined.

By way of example, a respective color image of the object 8 is recorded by the color image detectors 45 and 49 shown in FIG. 1 and these two color images are used for determining the corresponding positions. A prerequisite for this is that an assignment is known, indicating corresponding positions between the image recorded by the first color image detector 45 and the first image recorded by the first light image detector 13, and that a further assignment is known, indicating corresponding positions between the image recorded by the second color image detector 49 and the second image recorded by the second light image detector 15.

The determination of the assignment between the image recorded by the first color image detector 45 and the first image is comparatively simple, however, because these images are recorded from the same beam path or from the same direction with respect to the object 8. The determination of the assignment between the image recorded by the second color image detector 49 and the second image is likewise comparatively simple because these images are also recorded for the same beam path or from the same direction with respect to the object 8.

Referring to FIG. 2 once again, the method comprises a step S4, which involves determining a spatially resolved distribution of a property of the object 8 on the basis of the first and second images and on the basis of the corresponding positions. This means that a value of an object property is determined for the multiplicity of locations of the object, wherein the value assigned to a location of the multiplicity of locations of the object 8 is calculated using an intensity value at the first position, which represents the location, in the first image and an intensity value at the second position, which represents the location, in the second image. This is explained in greater detail with reference to FIG. 3.

In step S4, a value of an object property is calculated for a multiplicity of locations of the object 8, for example for the location A. That value of the object property which is assigned to the location A is calculated using the intensity value of the first image B1 at the first position B1-A. The value is further calculated on the basis of the intensity value of the second image B2 at the second position B2-A. Therefore, the intensity values of the first and second images at corresponding positions are used to determine the value of the object property for the location of the object 8 which is represented by the corresponding positions.

The intensity value at the first position in the first image can in turn be determined on the basis of the intensity value of that pixel of the first image which contains the first position. Additionally or alternatively, the intensity value at the first position in the first image can be determined on the basis of the intensity value of at least one of those pixels of the first image which adjoin the pixel of the first image which contains the first position. This is explained with reference to FIG. 4.

FIG. 4 shows nine pixels 71 to 79 of the multiplicity of pixels of the first image B1. An exemplary first position B1-A for which an intensity value is intended to be determined is represented by a cross within the pixel 71. The pixel 71 contains the first position B1-A. Therefore, the intensity value of the pixel 71 can be determined as the intensity value of the first position B1-A. The pixels 72 to 79 directly adjoin the pixel 71 containing the first position B1-A. Therefore, the intensity values of the pixels 72 to 79 can likewise be used for determining the intensity value of the first position B1-A. By way of example, the intensity value of the first position B1-A is determined as a linear combination of the individually weighted intensity values of the pixels 71 to 79. The intensity value at the second position B2-A in the second image B2 can also be determined in an analogous manner, the second position B2-A—like the first position B1-A—representing the same location A of the object 8.

Referring to FIG. 2 once again, the spatially resolved distribution of the object property that is calculated in step S4 is represented in a step S5. By way of example, the controller 37 generates a third image, which represents the calculated values of the object property, i.e., the spatially resolved distribution of the object property. This monoscopic image is then represented by the display system 39. The spatially resolved distribution of the object property can be represented in superimposition with an image, in particular a color image, of the object.

Additionally or alternatively, the controller 37 can generate a stereo image having a first stereoscopic half-image and a second stereoscopic half-image, wherein the first half-image represents the values of the object property, typically in superimposition with the first image, and wherein the second half-image represents the values of the object property, also typically in superimposition with the second image. The stereo image can then be represented by the di splay system 39.

A further exemplary embodiment of the method is described with reference to FIGS. 5 and 6. This exemplary embodiment corresponds to the greatest possible extent to the exemplary embodiment described above with reference to FIG. 2. Substantially only the deviating features are described below.

Figure 5:
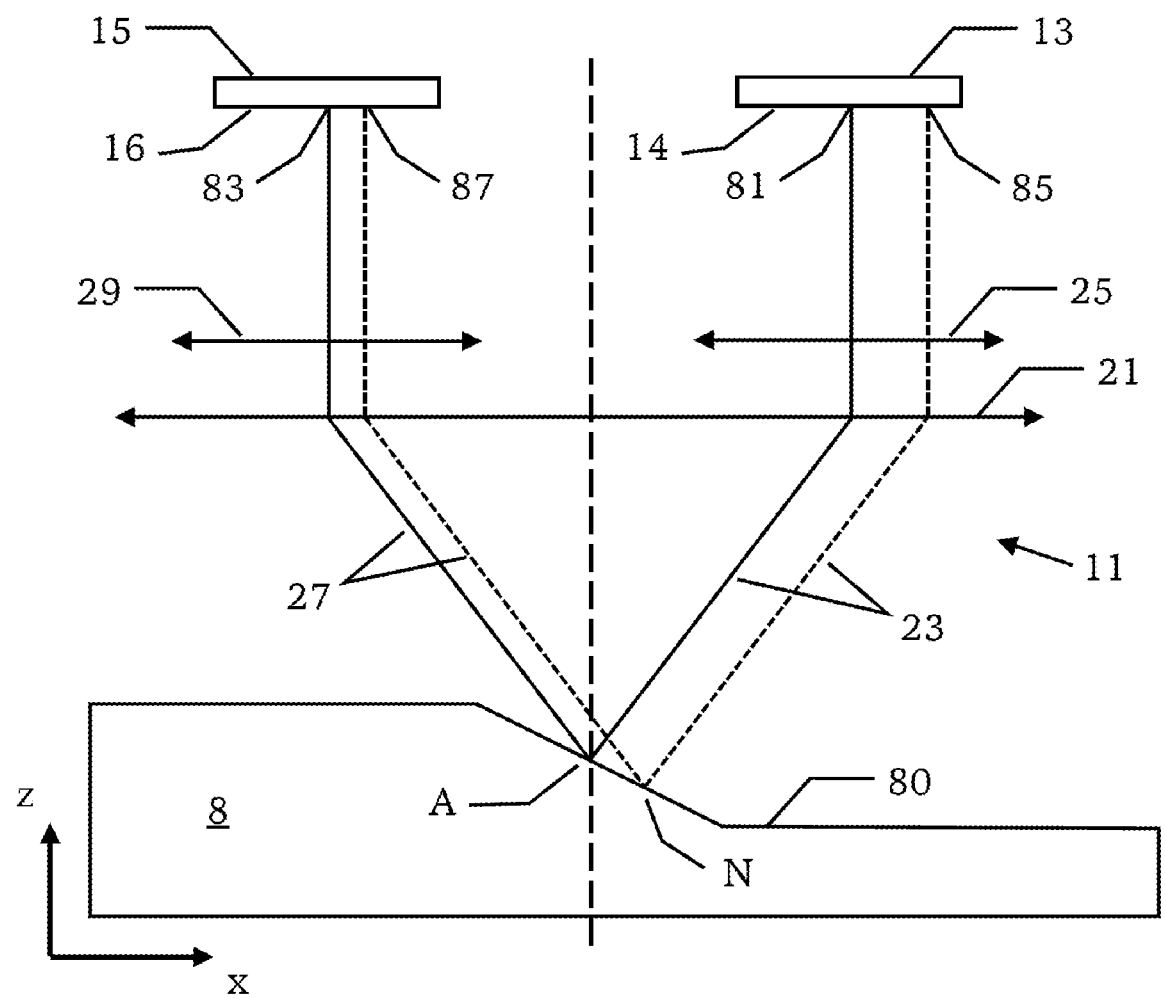
FIG. 5 shows effects on the positions of the locations on detection surfaces of second image detectors, onto which an object is imaged, the effects being caused by the height profile of the object.

FIG. 5 shows part of the microscopy system 1 illustrated in FIG. 1, mainly the objective 21, the first lens system 25, the second lens system 29, the first light image detector 13 and the second light image detector 15. The object 8 is illustrated in profile, i.e., in cross section through the object 8 in the x-z-plane. The object 8 has an extent along the z-direction (height profile 80) that varies as a function of the x-direction. In this case, the z-direction corresponds to a height direction of the object and the x-direction (and also the y-direction oriented perpendicularly to the x-z-plane) correspond to a transverse direction oriented perpendicularly to the height direction.

The microscope optical unit 11 images the location A of the object 8 onto a location 81 on the detection surface 14 of the first light image detector 13 via the beam path 23. The microscope optical unit 11 additionally images the location A onto a location 83 on the detection surface 16 of the second light image detector 15 via the second beam path 27.

A further location N of the object 8 is imaged onto a location 85 on the detection surface 14 of the first light image detector 13 via the first beam path 23 by the microscope optical unit 11. The location N is additionally imaged onto a location 87 on the detection surface 16 of the second light image detector 15 via the second beam path 27 by the microscope optical unit 11.

The distance between the locations 81 and 85 is greater than the distance between the locations 83 and 87. This illustrates the fact that the height profile 80 of the object 8 influences the location on the detection surface of a light image detector onto which a location of the object is imaged. Accordingly, the first position in the first image and the second position in the second image, which represent in each case the same location of the object, are also dependent on the height profile of the object.

Given knowledge of the imaging properties of the microscope optical unit 11, using the height profile 80 of the object 8, corresponding positions in the first and second images can be calculated by the controller 37.

Figure 6:
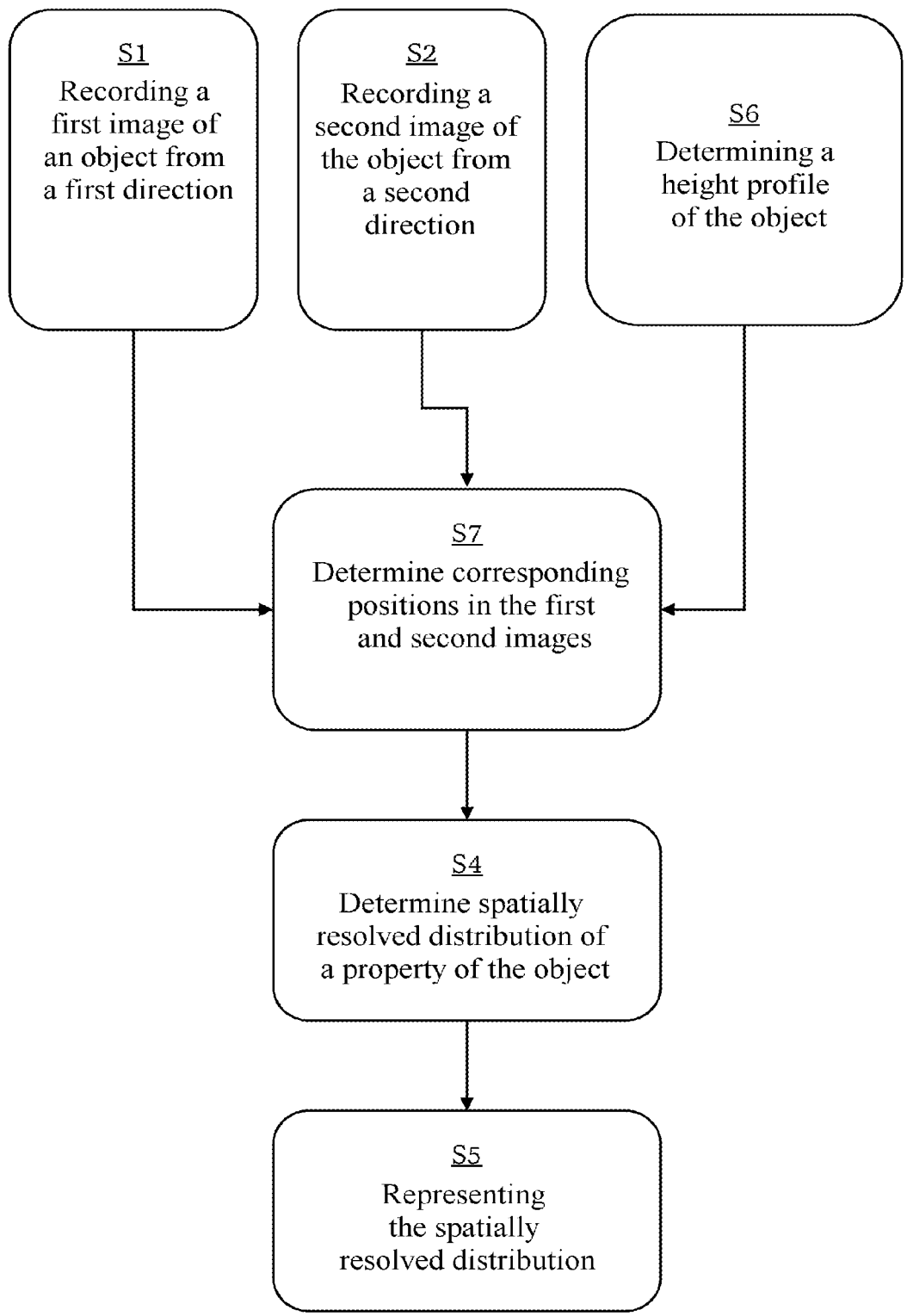
FIG. 6 shows a further exemplary embodiment of a method for determining a property of an object.

FIG. 6 shows a schematic overview of a method in accordance with this exemplary embodiment. Steps S1, S2, S4, and S5 correspond to the steps that have been explained with reference to FIG. 2. By comparison with the exemplary embodiment described with reference to FIG. 2, the method in accordance with this exemplary embodiment comprises the further step S6 and a step S7 modified relative to step S3.

Step S6, which is carried out before step S7, involves determining the height profile 80 of the object 8. The height profile 80 can be determined with various methods, for example by stereoscopy. Alternatively, a specific height profile sensor can be used, for example on the basis of the time-of-flight measurement of a signal emitted by this sensor and received by the sensor after reflection at the object 8 (triangulation), and the like.

Step S7, which is carried out before step S4, involves determining corresponding positions in the first and second images, as in step S3 of the exemplary embodiment described with reference to FIG. 2, wherein in contrast to step S3 the determination of the corresponding positions is carried out on the basis of the height profile 80 determined in step S6. Accordingly, the first position in the first image and the second position in the second image, which represent in each case the same location of the multiplicity of locations of the object, are determined on the basis of the height profile 80. Imaging properties of the microscope optical unit 11 can further be taken into account during this determination.

In contrast to the method for determining corresponding positions in the first and second images in accordance with step S3, as explained in association with FIG. 3, for the determination of the corresponding positions in accordance with step S7, it is not necessary for the object 8 to have high-contrast structures (cf. structures 67 in FIG. 3).

The methods described above can be used for determining various properties of an object. Some application examples are described below.

In accordance with an exemplary embodiment, the method is used for determining the concentration of a substance present in the object. For this purpose, the object is exposed with illumination light, such that the light emanating from the object comprises light in the first wavelength range and light in the second wavelength range.

Figure 7:
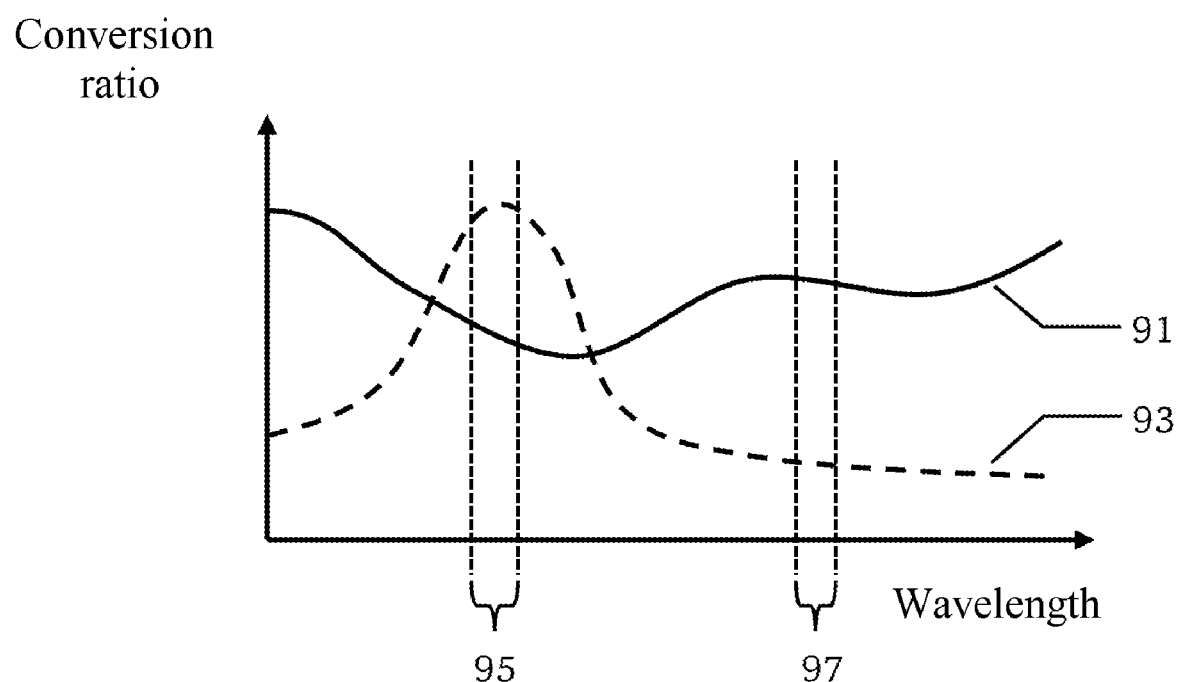
FIG. 7 shows wavelength-dependent conversion ratios of substances contained in an object.

FIG. 7 shows the wavelength-dependent conversion ratio of illumination light to light emanating from the object. A curve 91 defines the conversion ratio for a first substance present in the object 8; the curve 93 defines the conversion ratio for a second substance present in the object. The wavelength-dependent conversion ratios of the two substances (curves 91, 93) differ from one another.

The first wavelength range 95 and the second wavelength range 97 are generally two different wavelength ranges. In particular, they can at most partly overlap or else not overlap. In the example shown in FIG. 7, the two wavelength ranges do not overlap.

The illumination light directed onto the object is converted by the two substances contained in the object 8 in accordance with the curves 91 and 93 and thus contributes to the light emanating from the object 8. The light emanating from the object 8 therefore comprises light in the first wavelength range 95 and light in the second wavelength range 97.

With knowledge of the conversion ratios of the substances contained in the object 8 (curves 91 and 93), of the wavelength-dependent intensity distribution of the illumination light, the recorded first image, the recorded second image and the corresponding positions in the first and second images, it is possible to calculate a spatially resolved distribution of the concentration of the substances contained in the object. Details concerning the calculation can be gathered for example from the German patent applications DE 10 2017 221 187.3 and DE 10 2017 215 158.7, the disclosure of which is incorporated by reference herein.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A method for determining a property of an object, the method comprising:
    recording, in a first stereo branch of a microscope optical unit of a stereomicroscope, a first image of the object from a first direction, the recording of the first image comprising imaging the object onto a detection surface of a first light image detector with light in a first wavelength range emanating from the object;
    recording, in a second stereo branch of the microscope optical unit of the stereomicroscope different from the first stereo branch, a second image of the object from a second direction, the recording of the second image comprising imaging the object onto a detection surface of a second light image detector with the light in a second wavelength range emanating from the object;
    determining, for a multiplicity of locations of the object, a first position in the first image, the first position representing a location of the object, and a second position in the second image, the second position representing a same location of the object; and
    calculating a value of an object property for each location of the multiplicity of locations of the object, wherein the value of the object property assigned to a respective location of the multiplicity of locations of the object is calculated based on an intensity value at the first position, which represents the location in the first image, and based on an intensity value at the second position, which represents the same location in the second image,
    wherein the first and second images are recorded simultaneously.

2. The method according to claim 1, wherein the first position in the first image corresponds to a first location on the detection surface of the first light image detector, wherein the location of the object that is represented by the first position is imaged onto the first location of the detection surface of the first light image detector with the microscope optical unit, wherein the second position in the second image corresponds to a second location on the detection surface of the second light image detector, and wherein the same location of the object that is represented by the second position is imaged onto the second location of the detection surface of the second light image detector with the microscope optical unit.

3. The method according to claim 1, wherein the first image has a multiplicity of first pixels and a respective intensity value is assigned to each first pixel, wherein the intensity value at the first position is determined based on at least one of: the respective intensity value of the first pixel containing the first position, or the respective intensity value of at least one of the first pixels which adjoin the first pixel containing the first position.

4. The method according to claim 1, wherein the second image has a multiplicity of second pixels and a respective intensity value is assigned to each second pixel, wherein the intensity value at the second position is determined based on at least one of the respective intensity value of the second pixel containing the second position, or the respective intensity value of at least one of the second pixels which adjoin the second pixel containing the second position.

5. The method according to claim 1, further comprising: determining the first position and the second position for each location of the multiplicity of locations of the object based on an analysis of images of the object, wherein a shape of at least one structure of the object is analyzed in the images.

6. The method according to claim 1, further comprising: determining a coordinate transformation that defines a transition of coordinates of a first coordinate space of the first image into a second coordinate space of the second image, wherein the first position and the second position for each location of the multiplicity of locations of the object are determined on the basis of the coordinate transformation.

7. The method according to claim 6, further comprising: parameterizing the coordinate transformation with one or more parameters from a group of parameters, wherein the group of parameters includes a displacement between the first and second coordinate spaces; a rotation of the first coordinate space relative to the second coordinate space; a magnification of the microscopy optical unit in the course of recording the first image, the second image, or the first image and the second image; the first direction; the second direction; imaging aberrations of the microscopy optical unit; and a height profile of the object.

8. The method according to claim 6, wherein the coordinate transformation is a projective transformation, an affine transformation, a similarity transformation, or a Euclidian transformation.

9. The method according to claim 1, further comprising: determining a height profile of the object, the height profile indicating an extent of the object measured along a height direction as a function of at least one transverse direction oriented perpendicularly to the height direction, wherein the first position and the second position for each location of the multiplicity of locations of the object are determined based on the height profile.

10. The method according to claim 9, wherein the height profile of the object is determined by triangulation or stereoscopy.

11. The method according to claim 1, wherein the first wavelength range and the second wavelength range overlap at most partly.

12. The method according to claim 11, wherein the first wavelength range and the second wavelength range do not overlap.

13. The method according to claim 11, wherein one of the plurality of fluorescent emitters is not a fluorescent dye added to the object.

14. The method according to claim 1, further comprising:
exposing the object with the illumination light such that the light emanating from the object includes light in the first wavelength range and light in the second wavelength range,
wherein the object property is a concentration of one of a plurality of substances present in the object, and
wherein each of the substances contributes to the light emanating from the object as a result of the exposing of the object with the illumination light.

15. The method according to claim 1, further comprising: exposing the object with light in the first wavelength range and with light in the second wavelength range, wherein the first image is recorded substantially exclusively with light in the first wavelength range emanating from the object, wherein the second image is recorded substantially exclusively with light in the second wavelength range emanating from the object, and wherein the object property is the concentration of a haemodynamic variable such that a spatially resolved distribution of the concentration of the haemodynamic variable is calculated.

16. The method according to claim 1, further comprising: exciting a plurality of different fluorescent emitters distributed in the object such that the light emanating from the object includes fluorescent light from the plurality of fluorescent emitters; recording the first image substantially exclusively with light in the first wavelength range; recording the second image substantially exclusively with light in the second wavelength range, wherein the first and second wavelength ranges together at least partly include each of the emission wavelength ranges of the plurality of fluorescent emitters, and wherein the object property is the concentration of one of the plurality of fluorescent emitters; and calculating a spatially resolved distribution of the concentration of the fluorescent emitter.

17. The method according to claim 16, wherein one of the plurality of fluorescent emitters is a fluorescent dye added to the object.

18. The method according to claim 16, wherein the fluorescent dye added to the object is protoporphyrin IX.

19. The method according to claim 1, further comprising: filtering the light emanating from the object to substantially exclusively feed light in the first wavelength range to the first light image detector; recording the first image substantially exclusively with the light in the first wavelength range emanating from the object; filtering the light emanating from the object to substantially exclusively feed light in the second wavelength range to the second light image detector; and recording the second image substantially exclusively with light in the second wavelength range emanating from the object.

20. The method according to claim 1, further comprising: generating a third image representing the values of the object property.

21. The method according to claim 1, further comprising: generating a stereo image having a first stereoscopic half-image and a second stereoscopic half-image, wherein the first stereoscopic half-image represents the values of the object property, and wherein the second stereoscopic half-image represents the values of the object property.

22. A device configured to carry out the method according to claim 1.

* * * * *